United States Patent [19]

Kroesser

[11] 4,030,378
[45] June 21, 1977

[54] REDUNDANT PUSHROD-TO-BELLCRANK CONNECTION

[75] Inventor: Edward James Kroesser, Milford, Conn.

[73] Assignee: United Technologies Corporation, Hartford, Conn.

[22] Filed: Mar. 11, 1976

[21] Appl. No.: 666,112

[52] U.S. Cl. .................... 74/469; 74/110; 74/519; 74/559; 403/11; 403/98; 403/116; 403/157

[51] Int. Cl.² .......................... G05G 1/04

[58] Field of Search .......... 74/99 R, 105, 110, 469, 74/519, 559; 403/11, 98, 116, 157

[56] References Cited

UNITED STATES PATENTS

| | | | |
|---|---|---|---|
| 888,635 | 5/1908 | Morris | 403/98 |
| 3,842,687 | 10/1974 | Fansler et al. | 74/519 X |

Primary Examiner—Allan D. Herrmann
Attorney, Agent, or Firm—Maurice B. Tasker; Vernon F. Hauschild

[57] ABSTRACT

A pushrod-to-bellcrank attachment includes a primary pivot connection and two secondary pin and slot connections so arranged relative to each other that there is a continuing operative connection of the pushrod to the bellcrank in the event the primary connection is lost by small arms fire. When the primary pivot is lost, the pins of the secondary connections act in conjunction with the slots, which are arcuate, as a large bearing struck about the primary pivot to maintain the rod and the bellcrank in their original relative positions about the primary pivot with no introduction of lost motion between bellcrank and rod.

8 Claims, 4 Drawing Figures

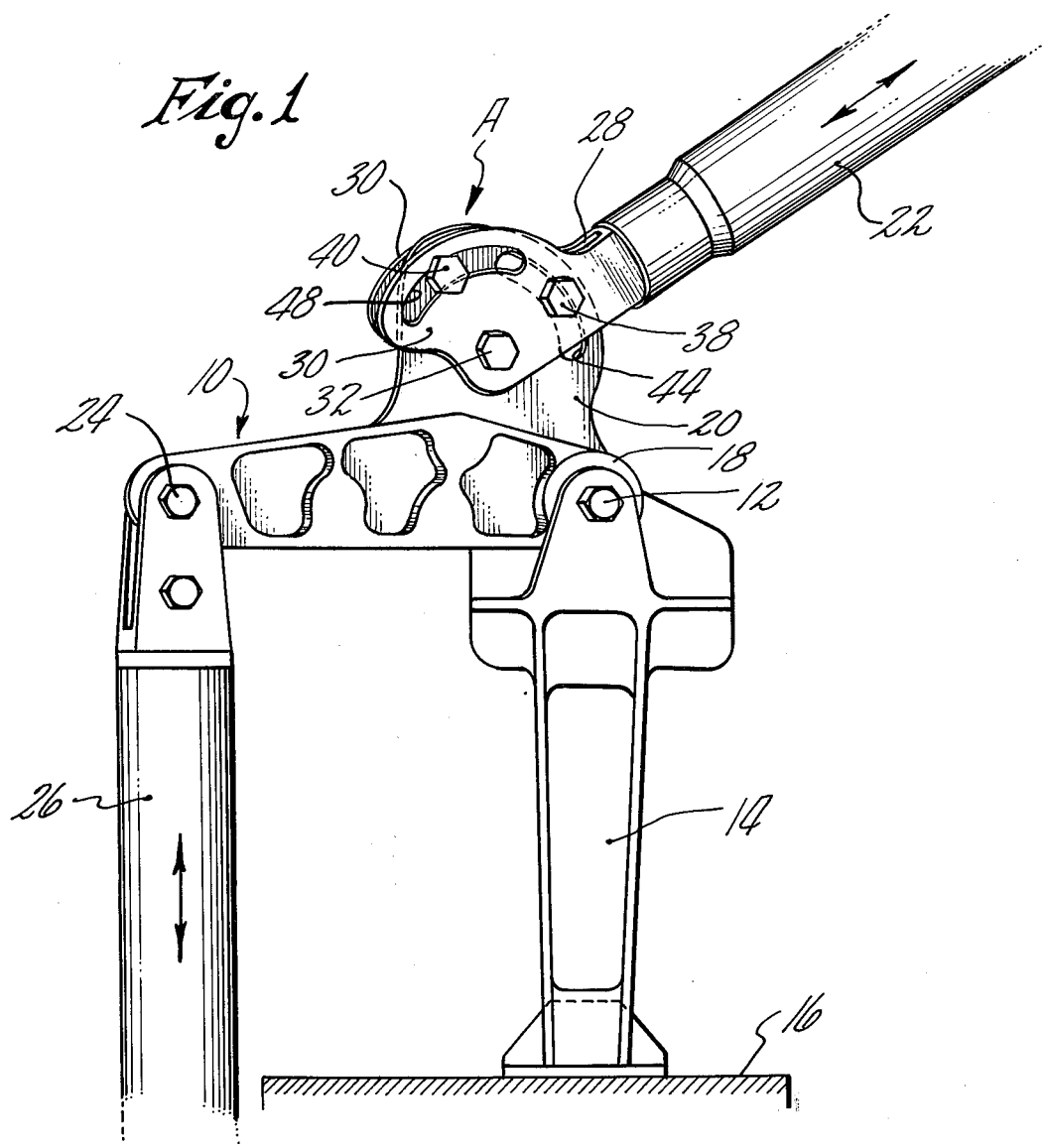
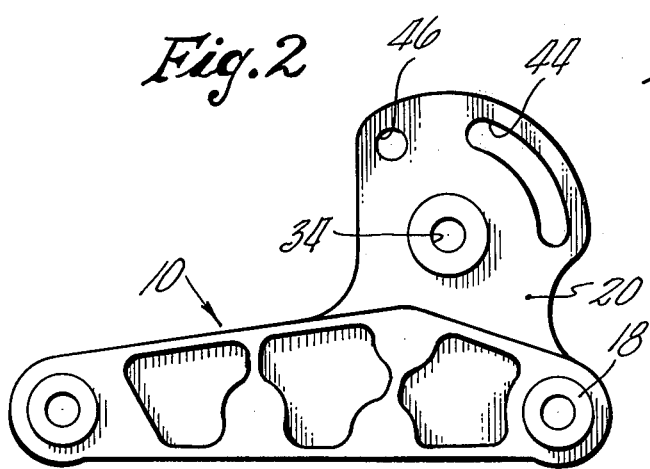
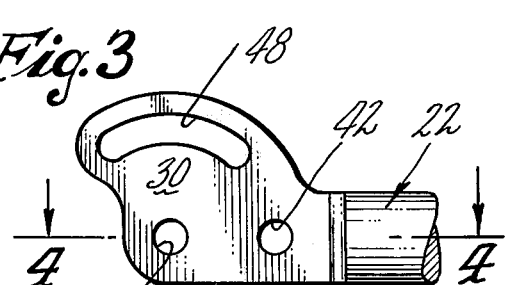
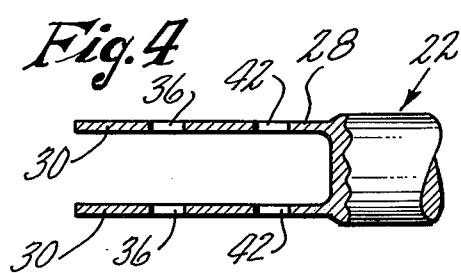

REDUNDANT PUSHROD-TO-BELLCRANK CONNECTION

The invention herein described was made in the course of or under a contract or subcontract thereunder with the Department of the Army.

BACKGROUND OF THE INVENTION

1. Field of Invention

This invention relates to aircraft control systems and more particularly to improvements in control systems for projectile damage tolerance.

2. Description of the Prior Art

In combat aircraft every reasonable precaution is taken to prevent damage to the aircraft control system from hits by bullets, shell fragments, and other projectiles. Duplicate control systems, heavier control system elements and armor to shield the more vulnerable parts of the control system have all been used. Each of these expedients has obvious disadvantages either from cost or weight penalty or from undesirable complexity. U.S. Pat No. 3,842,687, issued Oct 22, 1974 to J. D. Fansler et al. and assigned to the assignee of this application, was directed to this problem. However, in use it was determined that, upon loss of the primary pivot for the bellcrank, an undersiable amount of lost motion is introduced into the pushrod-bellcrank connection. The present invention is directed to improvements in the Fansler et al patent by which this unacceptable lost motion is eliminated

SUMMARY OF THE INVENTION

It is an object of this invention to provide a control system for aircraft having improved projectile damage tolerance.

Another object of this invention is the provision of a pivoted bellcrank-pushrod connection in such a control system so constructed that the controls will remain fully operative even though an element of the controls is destroyed by gun fire.

More specifically it is an object of this invention to provide two secondary pin and slot connections between the bellcrank and pushrod which are so related as to provide a redundant pivotal support equal in precision to the primary pivotal support between these two members.

To this end a control rod in an aircraft control system is connected to a bellcrank by a primary pivot and two secondary pivots. The primary pivotal connection is a bolt and nut connection which extends through aligned holes in the bellcrank and the clevis end of the control rod to provide a very precise control movement between rod and bellcrank. The two secondary connections are pin and slot connections between the bellcrank and the control rod. The slots, which are arcuate, are struck about the center of the primary pivot and are arranged so as to provide a substantially semi-circular bearing between bellcrank and rod end which duplicates the precise control movement of the primary pivot.

These objects, features and advantages of my invention will become more apparent from the following detailed description of a preferred embodiment thereof shown in the accompanying drawings.

BRIEF DESCRIPTION OF THE DRAWINGS

FIG. 1 is a side elevation of a portion of a control system showing the improved pushrod-to-bellcrank attachment of this invention;

FIG. 2 is a detail of the bellcrank shown in side elevation;

FIG. 3 is a detail of the pushrod end in side elevation; and

FIG. 4 is a section taken on line 4—4 of FIG. 3.

DESCRIPTION OF A PREFERRED EMBODIMENT

Referring to FIG. 1, the improved pushrod-to-bellcrank connection, generally indicated by A, includes a bellcrank member 10 pivoted at one of its ends at 12 to the upper end of a support member 14, the lower end of which is secured to frame structure 16 of the aircraft. Bellcrank 10 in the configuration shown is a generally horizontal member having a heavy hub portion 18 through which the pivot 12 extends and an integral upstanding, relatively thin fin-like portion 20 to which the pushrod 22 is connected. Bellcrank 10 also has a pivoted connection at 24 to a pushrod 26.

This invention is particularly concerned with the attachment of pushrod 22 to bellcrank 10 which provides an improved redundant pivotal connection between these two members capable of continuing the same precise movements of the members following loss of the primary pivot between these members by projectile damage. Pushrod 22 has a bifurcated end 28 the extremities of which are enlarged in area to form two side plates 30 which somewhat conform in shape to fin portion 20 of bellcrank 10 and receive portion 20 between them. A bolt 32 extends through and closely fits holes 34 and 36 in the fin and side plates respectively to form the primary connection between rod 22 and bellcrank 10. The redundant pivotal connection between pushrod 22 and bellcrank 10 comprises two bolts 38 and 40 which extend through and closely fit holes and slots in side plates 30 and fin 20. Bolt 38 extends through holes 42 in side plates 30 and through slot 44 in fin 20 which is struck about the center of pivot 32. Bolt 40 similarly extends through hole 46 in fin 20 and through slots 48 in side plates 30 identical to slot 44 in fin 20. Slot 44 and slots 48 are struck about the same center. The slots and holes in fin 20 and side plates 30 might in a different pair of connected members be differently located. For example, all of the slots could be formed in side plates 30 and the holes all in fin 20, or the reverse. However, in the connection shown the inclination of rod 22 from the horizontal and the rotational requirement of bellcrank 10 determined the arrangement shown, since slot 44 in fin 20 overlaps slots 48 in side plates 30. In any case slots 44 and 48 are all struck about the center of primary pivot 32.

If the primary pivot 32 is lost by projectile damage, bolts 38 and 40 and the closely fitting arcuate surfaces of slots 48 and 44 provide a large pin-and-slot bearing for the end of rod 22 which is concentric with primary pivot 32 and is capable of maintaining the same precise pivotal relationship between rod 22 and bellcrank 10 as was provided by primary pivot 32. Examining the function of this large bearing more closely it will be evident that pin 40 which passes through hole 46 in fin portion 20 of bellcrank 10 and also through arcuate slots 48 in side plates 30 of rod 22, prevents bolt 38 from dropping down in slot 44 of bellcrank 10, and rod 22 with it, out of the position shown in FIG. 1 in which the longitudinal axis of rod 22 extends through primary pivot 32. It is this movement of rod 22 out of its normal relation to pivot 32 which, prior to this invention, introduced unacceptable lost motion into the control system. It will be clear that maximum precision will be retained upon loss of the primary pivot 32 if this normal relationship of rod 22 to bellcrank 10 is maintained by spacing slots 44 and 48 on the large arcuate bearing so that radii drawn from the primary pivot 32 to the center of slots 44 and 48 are spaced about 90°.

While my invention has been described in connection with a push-to-bellcrank attachment, it will be understood that it is applicable to numerous pivot connections in aircraft control systems such, for example, as a pushrod-to-idler connection.

While I have shown one embodiment of my invention in considerable detail herein, I do not wish to be limited to the precise details shown since many variations will occur to one skilled in this art which fall within the scope of the appended claims.

I claim:

1. In an aircraft control system, a bellcrank member, a rod member, a primary pivot connecting one end of said rod member to said bellcrank member, secondary pivot means connecting said members comprising bearing means concentric with and spaced radially from said primary pivot, said bearing means including at least two spaced sets of aligned holes and arcuate slots in said members and pivot means extended through each set.

2. In an aircraft control system, a bellcrank member, a rod member, a primary pivot connecting an end of said rod member to an arm of said bellcrank member, a secondary pivot connecting said members comprising bearing means concentric with said primary pivot, said bearing means including two spaced sets of bearing elements, each set including a passage in one of said members and an arcuate slot in the other of said members and pivot means which is a close fit in said passage means and said slot extended through each set.

3. In an aircraft control system, a bellcrank member, a rod member, a primary pivot connecting one end of said rod member to said bellcrank member, a secondary pivotal connection between said members comprising bearing means for pivotally supporting said rod end on said bellcrank concentric with and radially spaced from said primary pivot, said bearing means including aligned passages and arcuate slots in said members and at least two pivot means extended through said aligned passages and slot means.

4. The control system of claim 3 in which the bearing means includes a separate slot in each member and aligned passages in the other member.

5. In an aircraft control system, a bellcrank member, a control rod member, first means connecting one end of said control rod member to said bellcrank member providing a primary pivot, second means adjacent said first means connecting the end of said rod member to said bellcrank member and providing a second pivot, said rod member normally having its longitudinal axis in substantial alignment with said primary pivot, and third means for attaching the end of said rod member to said bellcrank member providing means for maintaining the normal alignment of said rod member upon loss of said primary pivot.

6. In an aircraft control system, a bellcrank member, a rod member having a connection to said bellcrank member, said connection including means for attaching one end of said rod member to said bellcrank member providing a precise primary pivot, a second means for attaching said rod member to said bellcrank member providing a second pivotal connection between said rod and bellcrank members equally as precise as said primary pivot, said second pivotal connection comprising a pin-and-slot bearing between said bellcrank and rod members including arcuate slot means and cooperating spaced holes in said members, said slot means being struck about said primary pivot and said holes being aligned with said slot means and lying on radii extending from said primary pivot and subtending an arc of at least 90° and bolts extended through said slot means and holes providing the pins for said pin-and-slot bearing.

7. In an aircraft control system, a bellcrank member, a control rod member, a primary pivot connecting one end of said rod member to said bellcrank member, said primary pivot lying substantially in alignment with the longitudinal axis of said rod member, second pivot means for attaching said rod member to said bellcrank member including a first arcuate slot in one of said members and a passageway for a pivot bolt in the other of said members, and means for maintaining the alignment of said rod member upon loss of said primary pivot including a second arcuate slot in one of said members and a passageway for a second pivot bolt in the other of said members.

8. The control system of claim 7 in which the first and second arcuate slots are struck about the primary pivot and radii drawn from the primary pivot to the center of each of said slots define an angle of about 90°.

* * * * *